United States Patent
Lee et al.

(10) Patent No.: US 10,534,219 B2
(45) Date of Patent: Jan. 14, 2020

(54) ARRAY OF POINT LIGHT SOURCES CONTAINED WITHIN SEGMENTED REFLECTIVE PARTITIONS

(71) Applicant: Coretronic Corporation, Hsin-Chu (TW)

(72) Inventors: Yu-Ching Lee, Hsin-Chu (TW); Chih-Kuang Yang, Hsin-Chu (TW); Yi-Hsun Lee, Hsin-Chu (TW); Han-Yuan Liu, Hsin-Chu (TW); Ping-Yeng Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/006,799

(22) Filed: Jun. 12, 2018

(65) Prior Publication Data
US 2019/0004371 A1  Jan. 3, 2019

(30) Foreign Application Priority Data
Jun. 29, 2017  (CN) .......................... 2017 1 0514605

(51) Int. Cl.
*G02F 1/00* (2006.01)
*G02F 1/13357* (2006.01)

(52) U.S. Cl.
CPC .. *G02F 1/133605* (2013.01); *G02F 1/133608* (2013.01); *G02F 1/133603* (2013.01)

(58) Field of Classification Search
CPC ..................... G02F 1/133602–133606; G02F 1/133608–133611
See application file for complete search history.

(56) References Cited

U.S. PATENT DOCUMENTS

| 2006/0221612 | A1* | 10/2006 | Song ................. G02F 1/133603 362/247 |
| 2006/0249742 | A1* | 11/2006 | Noh .................. G02F 1/133603 257/98 |
| 2008/0094830 | A1* | 4/2008 | Chang ............... G02F 1/133605 362/235 |
| 2009/0086508 | A1 | 4/2009 | Bierhuizen |

(Continued)

FOREIGN PATENT DOCUMENTS

| CN | 102798043 A | 11/2012 |
| TW | 201413349 A | 4/2014 |

(Continued)

*Primary Examiner* — Gerald J Sufleta, II (57) ABSTRACT

A light source module includes a substrate, a reflective assembly and a plurality of point light sources. The reflective assembly is disposed above the substrate and has a plurality of first partition plates disposed along a first direction, a plurality of second partition plates disposed along a second direction and a plurality of reflective structures. The first and second partition plates cross with each other to form a plurality of reflective holes. An upper surface of the substrate is partially exposed to the reflective holes. The reflective structures are disposed in the reflective holes respectively. The first partition plates, the second partition plates and the reflective structures are integrally formed. The point light sources are disposed above the substrate, located in the reflective holes respectively, and located below the reflective structures respectively. Thus, the light source module can significantly reduce the light mixing distance.

12 Claims, 8 Drawing Sheets

(56) References Cited

U.S. PATENT DOCUMENTS

| | | | | |
|---|---|---|---|---|
| 2009/0128741 | A1* | 5/2009 | Peng | G02F 1/133603 349/67 |
| 2010/0141867 | A1* | 6/2010 | Ogihara | G02F 1/133605 349/61 |
| 2012/0188759 | A1* | 7/2012 | Sato | F21S 2/005 362/230 |
| 2012/0218752 | A1* | 8/2012 | Sumitani | F21V 11/14 362/235 |
| 2012/0268688 | A1* | 10/2012 | Sato | G02F 1/133603 349/62 |
| 2013/0056780 | A1* | 3/2013 | Kono | H01L 33/60 257/98 |
| 2013/0148036 | A1* | 6/2013 | Shimizu | H04N 5/64 348/739 |
| 2013/0222705 | A1* | 8/2013 | Shimizu | G02F 1/133605 348/790 |
| 2014/0016301 | A1* | 1/2014 | Brown Elliott | G02F 1/133603 362/97.1 |
| 2014/0140046 | A1* | 5/2014 | Ono | F21V 7/00 362/97.1 |
| 2014/0160733 | A1* | 6/2014 | Ono | F21K 9/60 362/97.1 |
| 2014/0204578 | A1* | 7/2014 | Kim | F21V 11/16 362/235 |
| 2015/0159834 | A1* | 6/2015 | Chang | G02F 1/133606 362/97.1 |
| 2015/0211715 | A1* | 7/2015 | Song | G02F 1/1336 362/97.3 |
| 2015/0219936 | A1* | 8/2015 | Kim | G02F 1/0105 362/97.1 |
| 2017/0023827 | A1* | 1/2017 | Tai | G02F 1/133603 |
| 2017/0261161 | A1* | 9/2017 | Moon | F21K 9/61 |
| 2018/0240420 | A1* | 8/2018 | Kumamoto | F21S 2/00 |

FOREIGN PATENT DOCUMENTS

| | | |
|---|---|---|
| TW | 201523094 A | 6/2015 |
| TW | 201610522 A | 3/2016 |

\* cited by examiner

ARRAY OF POINT LIGHT SOURCES CONTAINED WITHIN SEGMENTED REFLECTIVE PARTITIONS

CROSS-REFERENCE TO RELATED APPLICATION

THIS APPLICATION CLAIMS THE PRIORITY BENEFIT OF CHINA APPLICATION (CN201710514605.6 FILED ON 2017 Jun. 29). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a light source module, and more particularly to a light source module having a plurality of reflective holes.

BACKGROUND OF THE INVENTION

The backlight module is one of the key components of the liquid crystal display. Since the liquid crystal display panel itself does not emit light, the function of the backlight module is to provide a light source having sufficient luminance and uniform distribution so that the liquid crystal display panel can display the image normally. In general, the backlight module can be divided into the side type structure in which the light sources are disposed on the side thereof and the direct type structure in which the light sources are disposed direct under thereof. The side type backlight module is usually used for small and medium size LCD panels, and the direct type backlight module is usually used for larger size LCD panels.

Since the diffuser plate of the direct type backlight module is disposed above the light source, a distance between the light source and the diffuser plate must be maintained for the light mixing so that the light output can be uniform. Therefore, the conventional direct type backlight module will have certain thickness due to the requirement of the light source setting position and the light mixing distance, and it does not conform to the tendency of thinning. Thus, how to reduce the overall thickness of the backlight module and still have a good light mixing effect is the focus of attention of the persons in the field of the art.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a light source module to remarkably reduce the distance between the diffuser plate and the substrate of the light source module.

Other objectives and advantages of the invention will become apparent from the technical features disclosed in the invention.

In order to achieve one or a portion or all of the above objectives or other objectives, an embodiment of the invention provides a light source module, which includes a substrate, a reflective assembly and a plurality of point light sources. The reflective assembly is disposed above the substrate. The reflective assembly has a plurality of first partition plates disposed along a first direction, a plurality of second partition plates disposed along a second direction and a plurality of reflective structures. The plurality of first partition plates and the plurality of second partition plates cross with each other to form a plurality of reflective holes. An upper surface of the substrate is partially exposed to the plurality of reflective holes. The plurality of reflective structures are disposed in the plurality of reflective holes respectively. The plurality of first partition plates, the plurality of second partition plates and the plurality of reflective structures are integrally formed. The plurality of point light sources are disposed above the substrate, located in the plurality of reflective holes respectively, and located below the plurality of reflective structures respectively.

In order to achieve one or a portion or all of the above objectives or other objectives, an embodiment of the invention provides a light source module, which includes a substrate, a reflective assembly and a plurality of point light sources. The reflective assembly is disposed above the substrate. The reflective assembly has a plurality of reflective holes and a plurality of reflective structures. Each of the plurality of reflective holes is formed by at least one reflective surface not parallel to the substrate, so that an upper surface of the substrate is partially exposed to the plurality of reflective holes. The plurality of reflective structures are disposed in the plurality of reflective holes respectively. The reflective assembly is integrally formed. The plurality of point light sources are disposed above the substrate, located in the plurality of reflective holes respectively, and located below the plurality of reflective structures respectively.

In summary, by being disposed with a plurality of first partition plates, a plurality of second partition plates and a plurality of reflective strictures to form a plurality of reflective holes, the light source module of the embodiment of the invention allows the light emitted by the point light sources can be transmitted to the diffuser plate through a variety of ways. Thus, a better light mixing effect is generated, the problem that the light source in the reflective hole is concentrated in the center (i.e., the position where the point light source is located) is avoided, the light mixing distance between the diffuser plate and the substrate of the light source module is remarkably reduced, and accordingly the thickness of the light source module is remarkably reduced.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
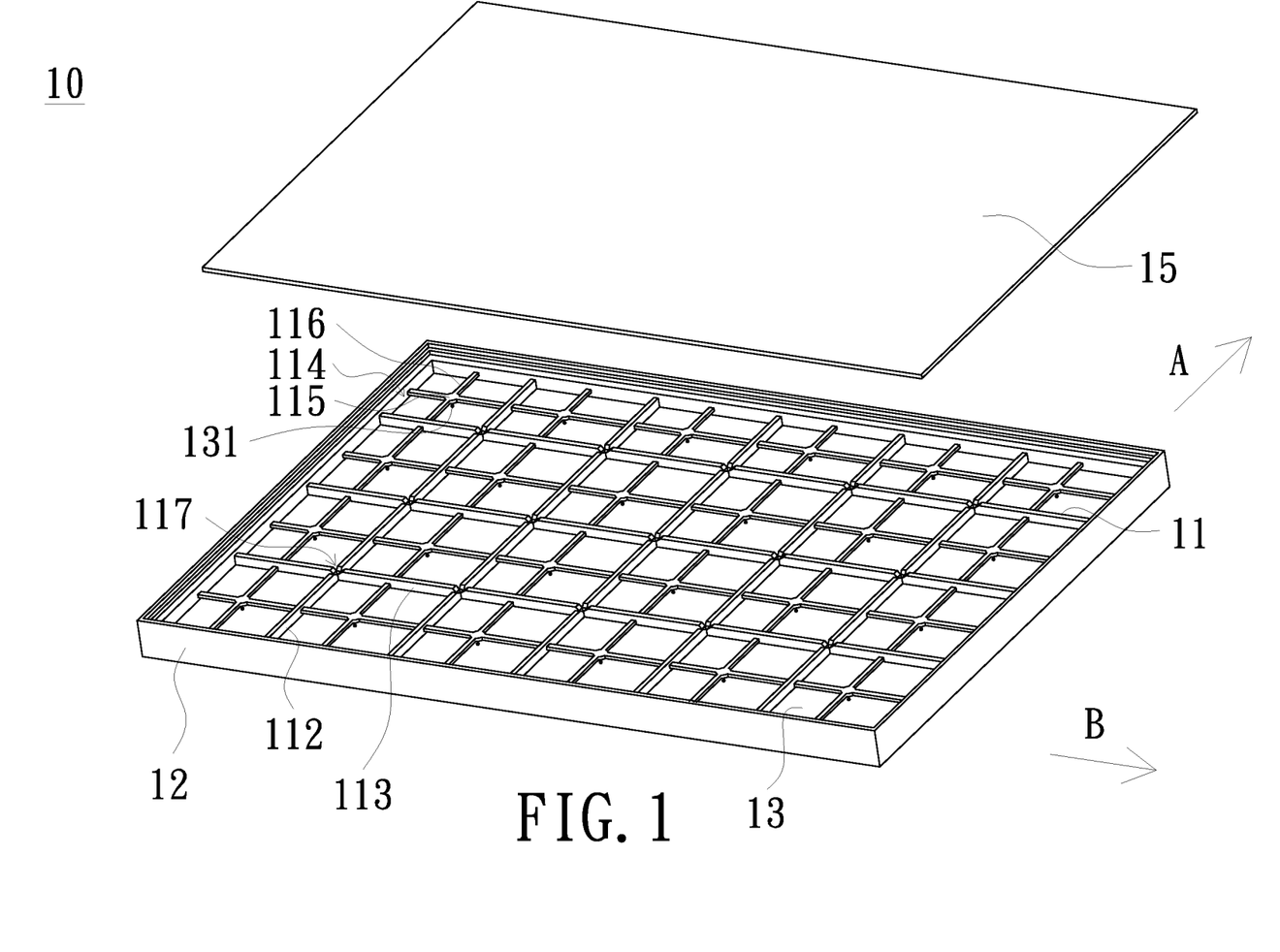
FIG. 1 is an exploded view of a light source module in accordance with an embodiment of the invention.
Figure 2:
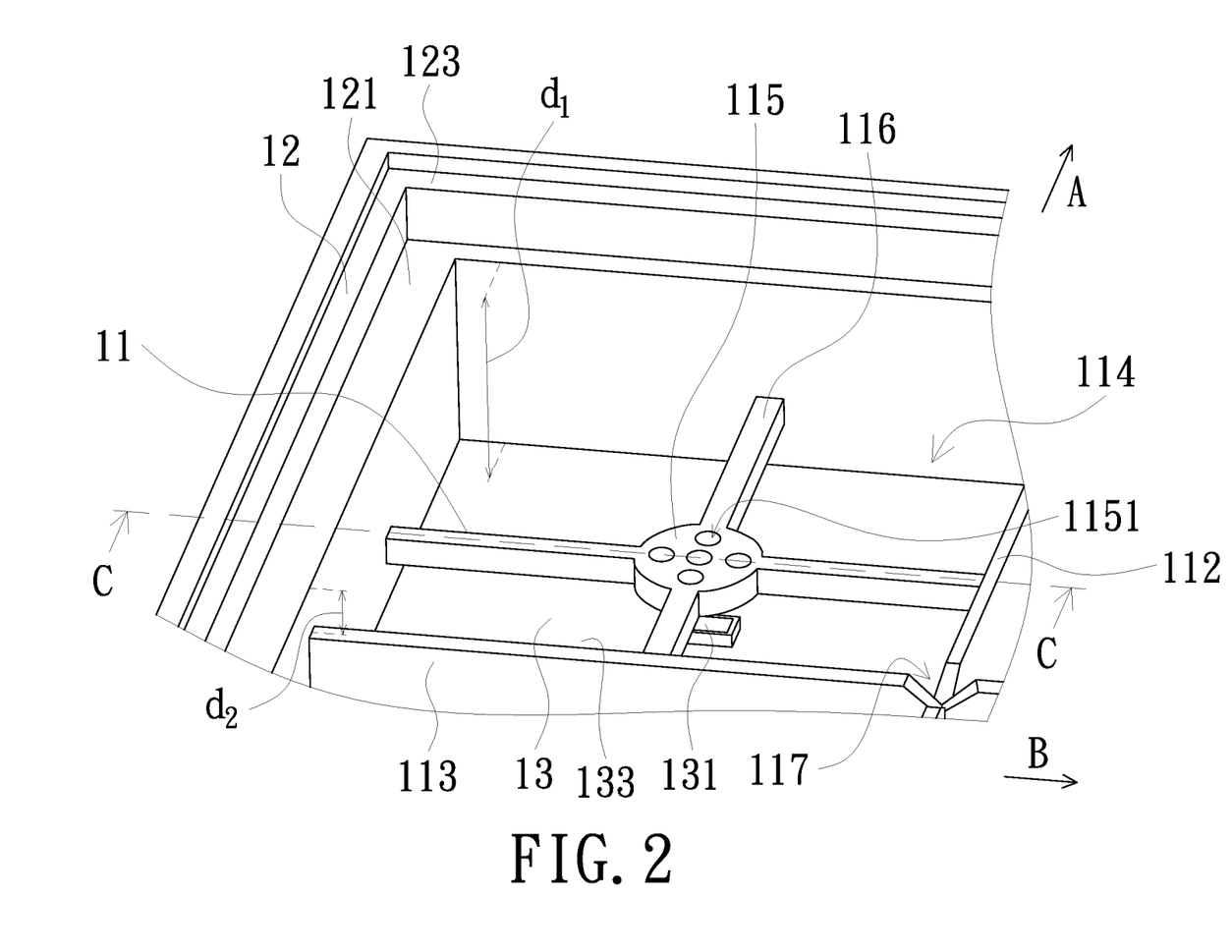
FIG. 2 is a schematic partial structural view of a light source module in accordance with an embodiment of the invention.
Figure 3:
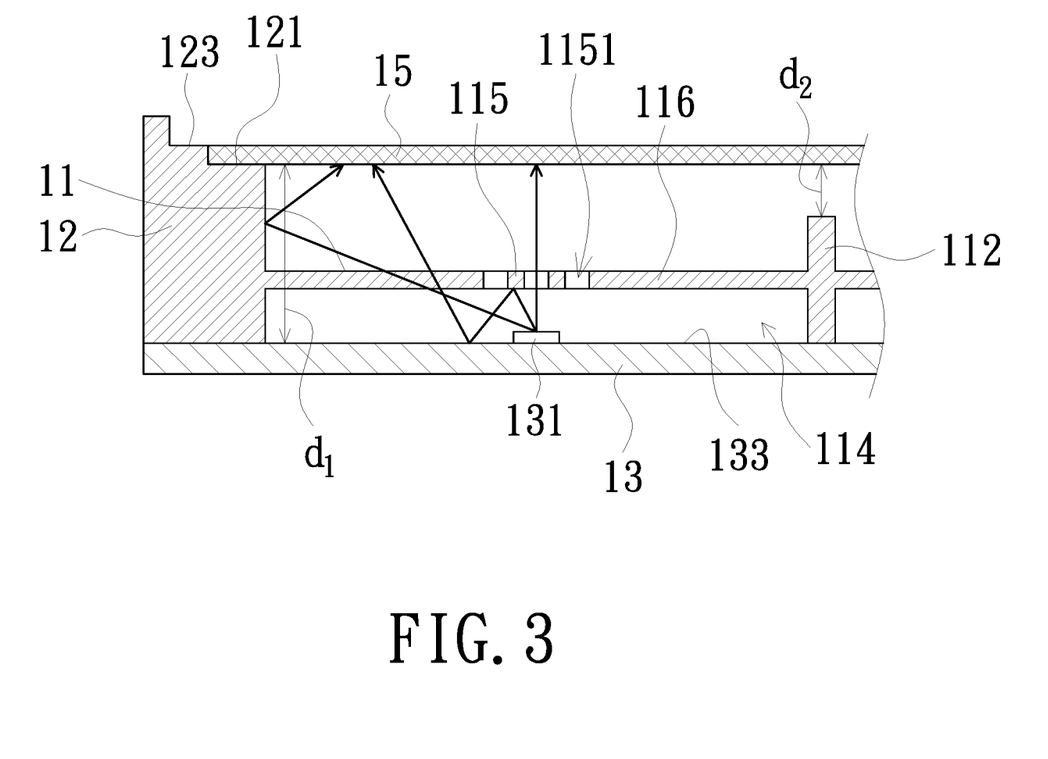
FIG. 3 is a schematic cross-sectional view of a partial structure of a light source module in accordance with an embodiment of the invention.

FIG. 1 is an exploded view of a light source module in accordance with an embodiment of the invention. FIG. 2 is a schematic partial structural view of a light source module shown in FIG. 1. FIG. 3 is a schematic cross-sectional view of a partial structure of a light source module shown in FIG. 2, taken along the line C-C. For convenience of description, the diffuser plate 15 is not shown in FIG. 2. Please refer to FIGS. 1, 2, and 3. The light source module 10 includes a reflective assembly 11, a substrate 13 and a plurality of point light sources 131. The reflective assembly 11 is disposed above the substrate 13 and has a plurality of first partition plates 112, a plurality of second partition plates 113 and a plurality of reflective structures 115, wherein the first partition plates 112, the second partition plates 113 and the reflective structures 115 are integrally formed.

The first partition plates 112 of the reflective assembly 11 are respectively disposed along the first direction A, and the second partition plates 113 are respectively disposed along the second direction B. The first partition plates 112 and the second partition plates 113 cross with each other to form a plurality of reflective holes 114, and the upper surface 133 of the substrate 13 is thus partially exposed to the reflective holes 114. In other words, each of the reflective holes 114 of the embodiment is composed of four reflective surfaces which are not parallel to the substrate 13, so that the upper surface 133 of the substrate 13 is partially exposed to the reflective holes 114, but the invention is not limit thereto. In other embodiments of the invention, each of the reflective holes 114 may be composed of at least one reflective surface which is not parallel to the substrate 13. For example, a reflective assembly having a honeycomb structure may be formed when each of the reflective holes of the reflective assembly is composed of six reflective surfaces which are not parallel to the substrate. Or, for example, a reflective assembly having an annular or bowl-shaped (hemispherical) reflective hole may be formed when each of the reflective holes of the reflective assembly is composed of one reflective surface which is not parallel to the substrate. The point light sources 131 are disposed on the substrate 13 and are located in the reflective holes 114 respectively. The reflective structures 115 are disposed in the reflective holes 114 respectively, and the point light sources 131 are located below the reflective structures 115 respectively.

Specifically, the reflective assembly 11 of the light source module 10 further includes, for example, a plurality of connecting members 116, and each of the reflective structures 115 of the reflective assembly 11 is connected with the first partition plates 112 and/or the second partition plates 113 of the reflective assembly 11 by at least one connecting members 116, so that the reflective structures 115 are disposed above the point light sources 131 respectively. In the embodiment, each of the reflective structures 115 is exemplified by being connected with the first partition plates 112 and the second partition plates 113 by four connecting members 116, so that the reflective structures 115 are disposed above the point light sources 131 respectively. In other embodiments of the invention, each of the reflective structures 115 may be connected with the first partition plates 112 and/or the second partition plates 113 by, for example, one, two or any number of the connecting members 116, and the invention is not limited thereto.

In addition, the light source module 10 may further include a frame 12 disposed around the reflective assembly 11. The frame 12 may have a support portion 121 and a support portion 123, for example.

In addition, the light source module 10 may further include a diffuser plate 15 disposed above the frame 12 and covering the reflective assembly 11. The diffuser plate 15 may be disposed on the support portion 121 of the frame 12 for example, and the support portion 123 of the frame 12 may be used to mount an element such as a liquid crystal panel for example, and the invention is not limited thereto. The frame 12 of the embodiment is exemplified by having two support portions 121 and 123, but the frame 12 may have more support portions for mounting various elements, and the invention is not limited thereto. The distance between the diffuser plate 15 and the upper surface 133 of the substrate 13 is a light mixing distance $d_1$ for mixing the light emitted from the point light sources 131, so that the light output of the light source module 10 is more uniform.

In the embodiment, the first partition plates 112, the second partition plates 113 and the reflective structures 115 of the reflective assembly 11 are integrally formed with the connecting members 116, so that the outer side of the reflective holes 114 located on the outside of the reflective assembly 11 may be the first partition plates 112 and/or the second partition plates 113. In addition, the frame 12 may be integrally formed with the reflective assembly 11, so that the outer side of the reflective holes 114 located on the outside of the reflective assembly 11 may be the inner side of the frame 12. In addition, the reflective assembly 11 and the frame 12 may be made of plastic and/or metal materials having a high reflectivity for example, and may be made of a plastic and/or metal material coated with a high reflectivity coating for example, but the invention is not limited thereto.

In the embodiment, the light source 131 is exemplified by a light emitting diode (LED), but the invention is not limited thereto. The light emitting direction of the point light source 131 is toward above the substrate 13, wherein the reflective structures 115 are located above the point light sources 131 and cover the light emitting surfaces of the point light sources 131 respectively. In addition, each of the reflective structures 115 may be penetrately provided with at least one light transmission hole 1151. In the embodiment, each of the reflective structures 115 is exemplified by being penetrately provided with five light transmission holes 1151, but the invention is not limited thereto.

When the light source module 10 is in operation, the point light sources 131 disposed on the substrate 13 are lit so that the point light sources 131 emit light upward. In the light emitted from the point light sources 131, a portion of the light is directly emitted to the diffuser plate 15 through the light transmission hole 1151 of the reflective structure 115, a portion of the light is directly incident on the diffuser plate 15, and the other portion of the light is reflected to the substrate 13 by the reflective structure 115. In the light reflected to the substrate 13 by the reflective structure 115, a portion of the light is directly reflected to the substrate 13 by the reflective structure 115, and a portion of the light is reflected to the first partition plate 112 and/or the second partition plate 113 by the substrate 13 and then is reflected to the diffuser plate 15 by the first partition plate 112 and/or the second partition plate 113. A portion of the light may be reflected by the substrate 13 and then emitted to the diffuser plate 15 through the light transmission hole 1151 of the reflective structure 115. Meanwhile a portion of the light may be reflected by the reflective structure 115 and the substrate 13 a plurality of times and then emitted to the diffuser plate 15. The diffuser plate 15 can diffuse and uniform the light and emit the light upwardly, so that the light source module 10 can provide a uniform surface light source for devices such as a liquid crystal display device, a light box or a commercial billboard.

The light source module 10 of the embodiment forms a plurality of reflective holes 114 through the disposition of the first partition plates 112, the second partition plates 113 and the reflective structures 115. Therefore, the light emitted by the point light source 131 disposed in the reflective hole 114 can be transmitted to the diffuser plate 15 via the above-described various transmission ways; that is, a portion of the light is emitted to the diffuser plate 15 by penetrating the reflective structure 115, a portion of the light is directly incident on the diffuser plate 15, and a portion of the light is reflected to the diffuser plate 15 via the substrate 13, the first partition plate 112 and/or the second partition plate 113. Thus, a better light mixing effect is generated, the problem that the light source in the reflective hole 114 is concentrated in the center (i.e., the position where the point light source 131 is located) is avoided, the light mixing distance $d_1$ between the diffuser plate 15 and the substrate 13 is remarkably reduced, and the thickness of the display device, the light box or the commercial billboard employing the light source module 10 of the embodiment is remarkably reduced. Since today's LCD device is seeking being thinner, the light source module 10 of the embodiment having a low light mixing distance $d_1$ and a better light mixing effect has a great application value. Meanwhile the reflective holes 114 formed by the first partition plates 112 and/or the second first partition plates 113 further can be applied to the local dimming of a display device, that is, the display characteristics, such as contrast, of the display device can be improved by respectively controlling the on/off and the luminance of the point light source 131 in each of the reflective holes 114.

Since the reflective assembly 11 and the frame 12 of the light source module 10 can be integrally formed, it is suitable for rapid mass production and cost reduction. The integrally-formed reflective assembly 11 and the frame 12 may be made of, for example, an injection-molded plastic material or a cast-formed metal material, and the invention is not limited thereto. Further, compared with the prior art that a lens is disposed above the light source to achieve the diffused emission, the accuracy required for the disposition of the integrally-formed reflective assembly 11 and the frame 12 of the light source module 10 of the embodiment is relatively low. That is, during the manufacture process, there is only need to dispose the integrally-formed reflective assembly 11 and the frame 12 on the substrate 13 so that the reflective structures 115 are located above the point light sources 131 and cover the light emitting surfaces of the point light sources 131 respectively, and accordingly, it is suitable for rapid mass production and reduction of assembly cost.

In addition, the upper surface 133 of the substrate 13 of the light source module 10 of the embodiment may further be coated with a coating having a high reflectivity to provide a good reflection effect, and the invention is not limited thereto.

As shown in FIGS. 2 and 3, in the embodiment, a distance $d_2$ may be formed between the top surface of the first partition plates 112 and the second partition plates 113 and the diffuser plate 15, so that the height of the first partition plates 112 and the second partition plates 113 is smaller than the light mixing distance $d_1$ between the diffuser plate 15 and the substrate 13. Since the distance $d_2$ is formed between the top surface of the first partition plates 112 and the second partition plates 113 and the diffuser plate 15, the first partition plates 112 and the second partition plates 113 are prevented from generating a shadow above the diffuser plate 15 so that the light emitted from the light source module 10 is more uniformed.

As shown in FIGS. 1 and 2, in the embodiment, the positions where the first partition plates 112 and the second partition plates 113 cross with each other may have recesses 117 recessed in the direction toward the substrate 13 to further avoid the generation of the shadow at the positions, so that the light output of the light source module 10 is more uniform. The shape of the recess 117 shown in FIGS. 1 and 2 is merely illustrative, and the invention is not limited thereto. It is within the scope of the invention as long as the positions where the first partition plates 112 and the second partition plates 113 cross with each other have recesses recessed in the direction toward the substrate 13.

In an embodiment of the invention, only the first partition plates 112, the second partition plates 113 and the reflective structures 115 of the reflective assembly 11 are integrally formed with the connecting members 116, and the frame 12 is not integrally formed with the reflective assembly 11.

In an embodiment of the invention, the reflective structures 115 of the reflective assembly 11 are not penetrately provided with the light transmission holes 1151, and the light source modules 10 performs the light mixing by only the light reflected by the reflective structures 115 to the substrate 13. Therefore, the problem that obvious bright spots are still formed on the diffuser plate when the light emitted from the center of the point light sources 131 having an intensity relatively larger than the light in the other directions penetrates the light transmission hole 1151 of the reflective structure 115 and is incident on the diffuser plate 15 is avoided.

In an embodiment of the invention, the first direction A and the second direction B may be, for example, perpendicular to each other so that the reflective holes 114 formed by crossing the first partition plates 112 and the second partition plates 113 with each other have a chessboard-like arrangement.

In an embodiment of the invention, the position where each of the connecting members 116 of the reflective assembly 11 is connected with the first partition plate 112 and/or the second partition plate 113 may further have a reinforcing structure (not shown). The reinforcing structure may be achieved, for example, by increasing the contact area of the position where each of the connecting members 116 of the reflective assembly 11 is connected with the first partition plate 112 and/or the second partition plate 113 so that the connection of each of the connecting members 116 with the first partition plates 112 and/or the second partition plates 113 is more stable, but the invention is not limited thereto.

Figure 4:
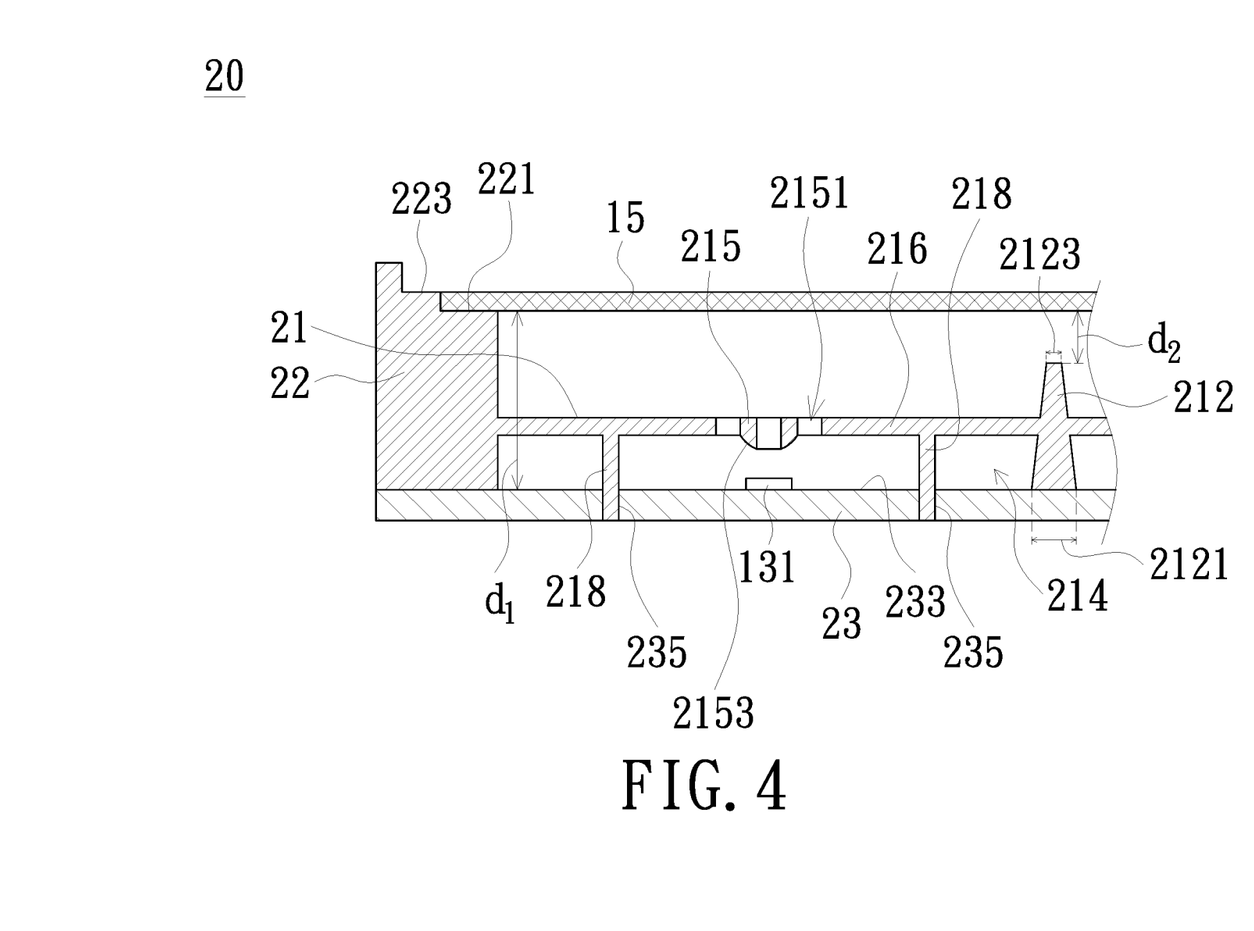
FIG. 4 is a schematic cross-sectional view of a partial structure of a light source module in accordance with another embodiment of the invention.

FIG. 4 is a schematic cross-sectional view of a partial structure of a light source module in accordance with another embodiment of the invention. As shown in FIG. 4, the light source module 20 includes a reflective assembly 21, a frame 22, a substrate 23, a diffuser plate 15 and a plurality of point light sources 131. The reflective assembly 21 has a plurality of first partition plates 212, a plurality of second partition plates (not shown), a plurality of reflective structures 215 and a plurality of connecting members 216. The reflective structure 215 has a plurality of light transmission holes 2151. The frame 22 has a support portion 221 and a support portion 223. The substrate 23 has an upper surface 233.

The light source module 20 of the embodiment has a similar structure and function as the light source module 10 shown in FIGS. 1, 2 and 3. The embodiment differs from the embodiment shown in FIGS. 1, 2 and 3 in that: each of the reflective structures 215 of the reflective assembly 21 may further have a reflective portion 2153 protruding toward the corresponding point light source 131. When the light emitted from the point light source 131 is incident on the reflective structure 215, a portion of the light is reflected by the protruding reflective portion 2153. The protruding reflective portion 2153 may have a better diffuser effect with respect to the plane reflective structure, so that the light emitted from the point light source 131 is more uniformly mixed in the reflective hole 214 of the reflective assembly 21 and accordingly the light output of the light source module 20 is more uniform. The shape of the reflective portion 2153 of the reflective structure 215 shown in FIG. 4 is merely illustrative, and the reflective portion 2153 may be, for example, a tapered protruding portion and/or a hemispherical protruding portion, and the invention is not limited thereto. It is within the scope of the invention as long as the reflective structure 215 of the reflective assembly 21 has a reflective portion protruding toward the corresponding point light source 131.

In addition, the reflective assembly 21 of the embodiment may further have a plurality of positioning pillars 218, and one end of each of the positioning pillars 218 is connected to one of the connecting members 216 and the other end is fixed to the substrate 23. In addition, the substrate 23 may further have a plurality of mounting holes 235 for example, and the other end of each of the positioning pillars 218 may be fixed to the corresponding mounting hole 235 of the substrate 23. Since one end of the positioning pillar 218 of the reflective assembly 21 is connected to the connecting member 216 and the other end is fixed to the mounting hole 235 of the substrate 23, the reflective assembly 21 can be disposed above the substrate 23 more securely, the overall structure of the light source module 20 is more secure, and the reflective structures 215 and the connecting members 216 of the reflective assembly 21 are also able to maintain a fixed spacing from the substrate 23 without causing the reflective structures 215 and the connecting members 216 to bend by some factors such as weight and thereby cussing a poor light mixing effect. In the embodiment, each connecting member 216 is exemplified by having one positioning pillar 218; however, in other embodiments, each connecting member 216 may have a plurality of positioning pillars 218, and the invention is not limited thereto.

In addition, each of the first partition plates 212 of the reflective assembly 21 in the embodiment has a bottom surface 2121 and a top surface 2123 opposite to each other, and the width of the top surface 2123 is smaller than the width of the bottom surface 2121. Each of the second partition plates (not shown) of the reflective assembly 21 in the embodiment also has a bottom surface and a top surface opposite to each other, and the width of the top surface is smaller than the width of the bottom surface. The structure of the second partition plate 212 may be the same or similar to the structure of the first partition plate 212. Since the width of the top surface 2123 of the first partition plate 212 of the reflective assembly 21 is smaller than the width of the bottom surface 2121 and the width of the top surface of the second partition plate is smaller than the width of the bottom surface, the top surface of the first partition plates 212 and the second partition plates near the diffuser plate 15 has a smaller width so that the first partition plates 212 and the second partition plates are prevented from generating a shadow above the diffuser plate 15 and accordingly the light output of the light source module 10 is more uniform. Since the bottom surface of the first partition plates 212 and the second partition plates still have a sufficient width so that the overall structural strength of the reflective assembly 21 can be maintained while maintaining the stability when the reflective assembly 21 is mounted on the substrate 23. In addition, the first partition plate 112 and the second partition plate 113 in the light source module 10 shown in FIGS. 1 to 3 may be replaced with the first partition plate 212 and the second partition plate of the embodiment.

In an embodiment of the invention, the first partition plates 212, the second partition plates, the reflective structures 215, the reflective portions 2153, the connecting members 216, the positioning pillars 218 of the reflective assembly 21 are integrally formed with the frame 22.

In an embodiment of the invention, the first partition plates 212, the second partition plates, the reflective structures 215, the reflective portions 2153, the connecting members 216 and the positioning pillars 218 of the reflective assembly 21 are integrally formed. The frame 22 is not integrally formed with the reflective assembly 21.

Figure 5A:
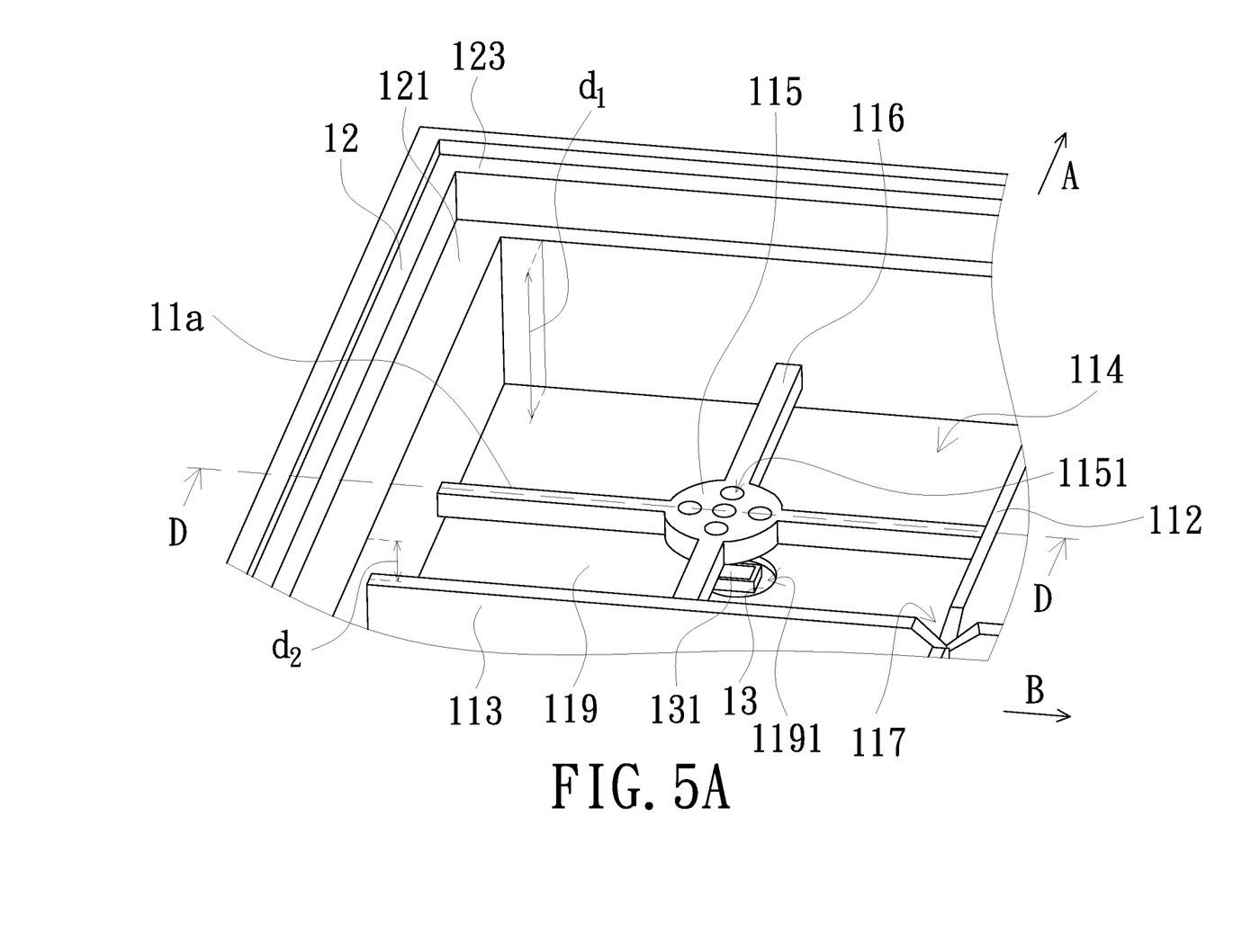
FIG. 5A is a schematic partial structural view of a light source module in accordance with another embodiment of the invention.
Figure 5B:
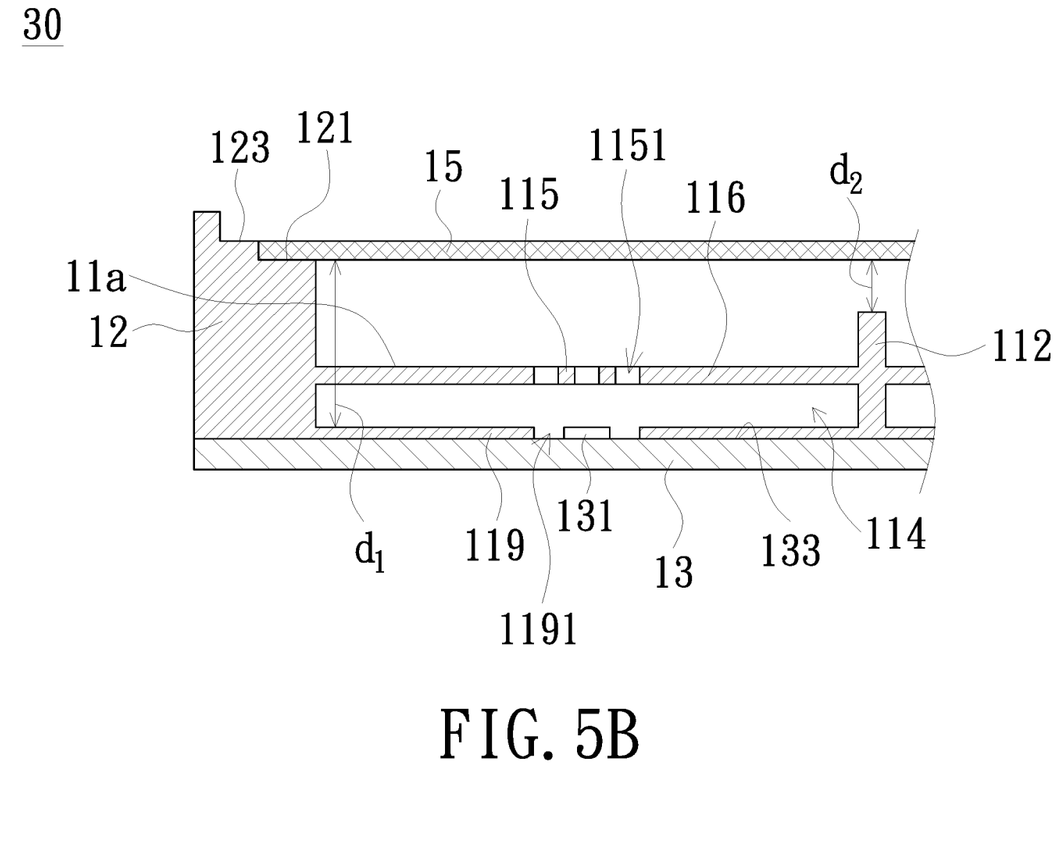
FIG. 5B is a schematic cross-sectional view of a partial structure of a light source module in accordance with another embodiment of the invention.

FIG. 5A is a schematic partial structural view of a light source module in accordance with another embodiment of the invention. FIG. 5B is a schematic cross-sectional view of a partial structure of a light source module shown in FIG. 5A, taken along the line D-D. For convenience of description, the diffuser plate 15 is not shown in FIG. 5A. Please refer to FIGS. 5A and 5B. The light source module 30 includes a reflective assembly 11a, a frame 12, a substrate 13, a diffuser plate 15 and a plurality of point light sources 131. The reflective assembly 11a has a plurality of first partition plates 112, a plurality of second partition plates 113, a plurality of reflective structures 115, a plurality of connecting members 116 and a bottom plate 119. The reflective structure 115 has a plurality of light transmission holes 1151.

The light source module 30 of the embodiment has a similar structure and function as the light source module 10 shown in FIGS. 1, 2 and 3. The embodiment differs from the embodiment shown in FIGS. 1, 2 and 3 in that: the reflective assembly 11a further has a bottom plate 119. The bottom plate 119 is disposed on the upper surface 133 of the substrate 13 and is located below the first partition plates 112 and the second partition plates 113. The bottom plate 119 is penetrately provided with a plurality of penetration holes 1191. The point light sources 131 are penetrately provided in the penetration holes 1191 of the bottom plate 119 respectively.

In the embodiment, the light emitted from the point light source 131 can be emitted through the penetration hole 1191 of the bottom plate 119. Meanwhile, the portion of the light emitted from the point light source 131 and reflected by the reflective structure 115 is reflected to the bottom plate 119. Since the bottom plate 119 may be made of a material having a high reflectivity, the light emitted from the point light source 131 can be mixed more uniform in the reflective hole 114 of the reflective assembly 11a and accordingly the light output of the light source module 30 is more uniform.

In an embodiment of the invention, the first partition plates 112, the second partition plates, the reflective structures 115, the connecting members 116 and the bottom plate 119 of the reflective assembly 11a are integrally formed with the frame 12.

Figure 6A:
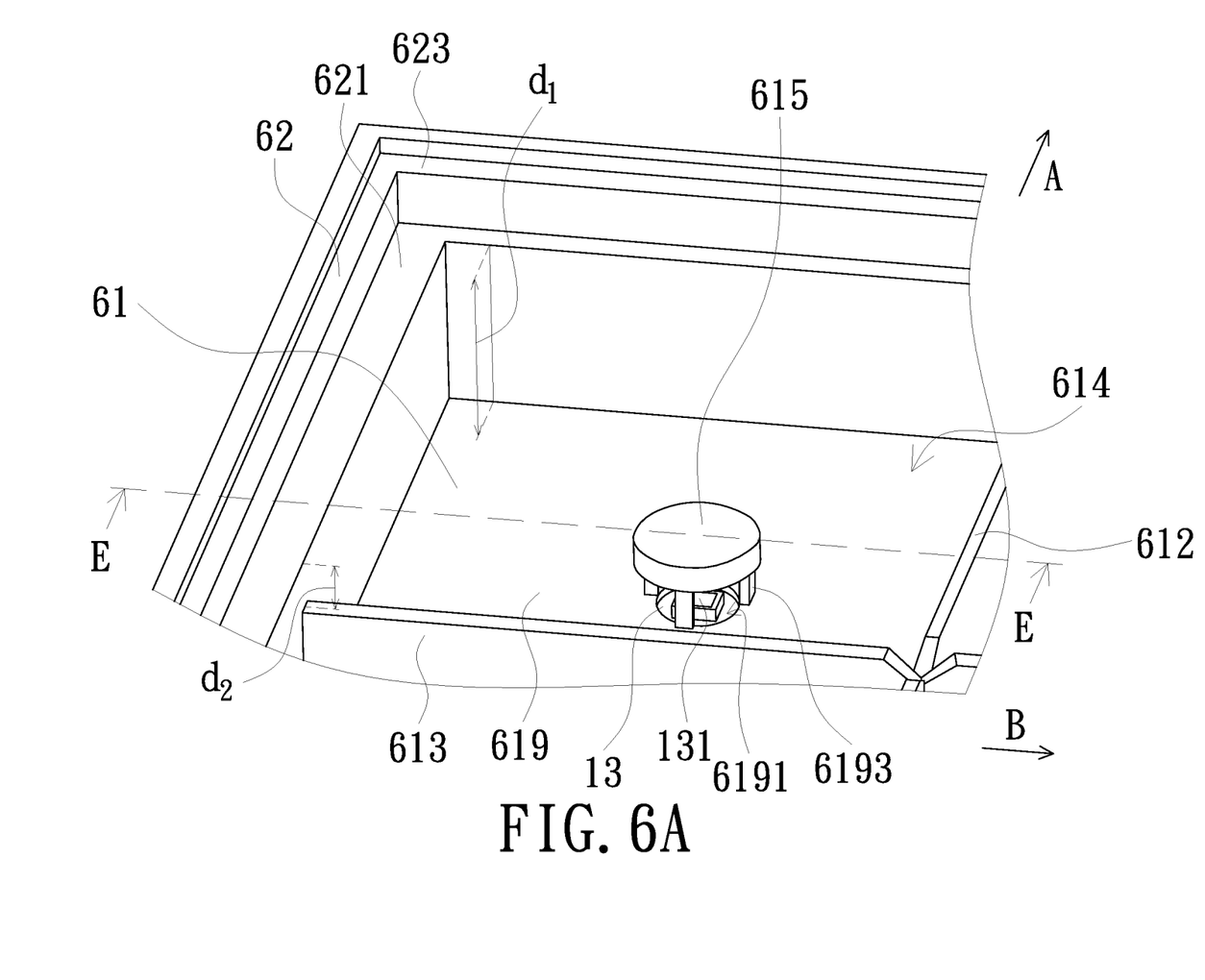
FIG. 6A is a schematic partial structural view of a light source module in accordance with another embodiment of the invention.
Figure 6B:
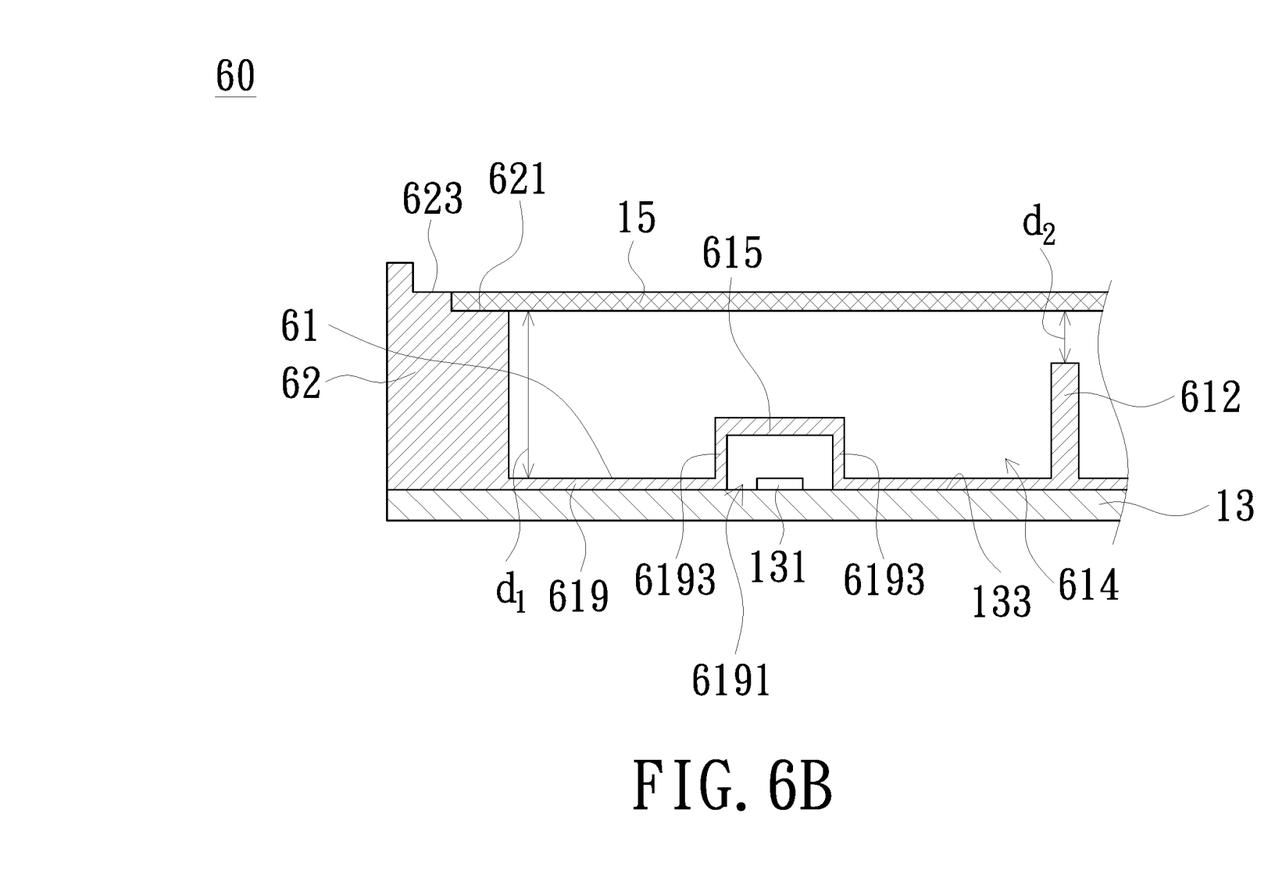
FIG. 6B is a schematic cross-sectional view of a partial structure of a light source module in accordance with another embodiment of the invention.

FIG. 6A is a schematic partial structural view of a light source module in accordance with another embodiment of the invention. FIG. 6B is a schematic cross-sectional view of a partial structure of a light source module shown in FIG. 6A, taken along the line E-E. For convenience of description, the diffuser plate 15 is not shown in FIG. 6A. Please refer to FIGS. 6A and 6B. The light source module 60 includes a reflective assembly 61, a substrate 13 and a plurality of point light sources 131. The reflective assembly 61 has a plurality of first partition plates 612, a plurality of second partition plates 613, a plurality of reflective structures 615, a bottom plate 619 and a plurality of connecting members 6193.

The light source module 60 of the embodiment has a similar structure and function as the light source module 10 shown in FIGS. 1, 2 and 3. The embodiment differs from the embodiment shown in FIGS. 1, 2 and 3 in that: the reflective assembly 61 of the embodiment does not have a connecting member and the reflective assembly 61 may further have a bottom plate 619 and a plurality of connecting members 6193. The bottom plate 619 is disposed on the upper surface 133 of the substrate 13 and is located below the first partition plates 612 and the second partition plates 613. The bottom plate 619 is penetrately provided with a plurality of penetration holes 6191. The point light sources 131 are penetrately provided in the penetration holes 6191 respectively. Each of the reflective structures 615 is connected to the bottom plate 619 by at least one connecting member 6193. In the embodiment, each of the reflective structures 615 is connected to the bottom plate 619 by four connecting members 6193, and the invention is not limited thereto.

In the embodiment, the reflective structure 615 of the reflective assembly 61 is connected to the bottom plate 619 by at least one connecting member 6193 to support the reflective structure 615 by the at least one connecting member 6193, so that the reflective structures 615 are respectively located above the point light sources 131 and cover the light emitting surface of the point light sources 131. Meanwhile the portion of the light emitted from the point light sources 131 and reflected by the reflective structures 615 is reflected to the bottom plate 119 and is then reflected by the bottom plate 619, so that the light can be mixed more uniform in the reflective hole 614 of the reflective assembly 61 and accordingly the light output of the light source module 60 is more uniform.

In an embodiment of the invention, the light source module 60 may further include a frame 62 and a diffuser plate 15. The frame 62 may have, for example, a support portion 621 and a support portion 623. The frame 62 and the diffuser plate 15 of the light source module 60 have a similar structure and function as the frame 12 and the diffuser plate 15 of the light source module 10 of the embodiment shown in FIGS. 1, 2 and 3, and no redundant detail is to be given herein.

In an embodiment of the invention, the bottom plate 619, the connecting members 6193, the first partition plates 612, the second partition plates 613 and the reflective structures 615 of the reflective assembly 61 are integrally formed with the frame 62.

In summary, by being disposed with a plurality of first partition plates, a plurality of second partition plates and a plurality of reflective structures to form a plurality of reflective holes, the light source module of the embodiment of the invention allows the light emitted by the point light sources can be transmitted to the diffuser plate through a variety of ways. Thus, a better light mixing effect is generated, the problem that the light source in the reflective hole is concentrated in the center (i.e., the position where the point light source is located) is avoided, the light mixing distance between the diffuser plate and the substrate of the light source module is remarkably reduced, and accordingly the thickness of the display device, the light box or the commercial billboard employing the light source module of the embodiment is remarkably reduced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A light source module, comprising:
   a substrate;
   a reflective assembly, disposed above the substrate, wherein the reflective assembly has a plurality of first partition plates disposed along a first direction, a plurality of second partition plates disposed along a second direction and a plurality of reflective structures, the plurality of first partition plates and the plurality of second partition plates cross with each other to form a plurality of reflective holes, an upper surface of the substrate is partially exposed to the plurality of reflective holes, and the plurality of reflective structures are disposed in the plurality of reflective holes respectively; and
   a plurality of point light sources, disposed above the substrate, located in the plurality of reflective holes respectively, and located below the plurality of reflective structures respectively;
   wherein the reflective assembly further has a plurality of connecting members and a plurality of positioning pillars, each of the plurality of reflective structures is connected with the plurality of first partition plates and/or the plurality of second partition plates by at least one of the plurality of connecting members, one end of each of the plurality of positioning pillars is connected to one of the plurality of connecting members and another end of each of the plurality of positioning pillars is fixed to the substrate, and the plurality of connecting members, the plurality of positioning pillars, the plurality of first partition plates, the plurality of second partition plates, and the plurality of reflective structures are integrally formed.

2. The light source module according to claim 1, wherein the first direction and the second direction are perpendicular to each other.

3. The light source module according to claim 1, wherein each of the plurality of first partition plates and the plurality of second partition plates has a bottom surface and a top surface opposite to each other, and a width of the top surface is smaller than a width of the bottom surface.

4. The light source module according to claim 1, wherein at least one position where the plurality of first partition plates and the plurality of second partition plates cross with each other has a recess recessed in a direction toward the substrate.

5. The light source module according to claim 1, wherein each of the plurality of reflective structures is penetratingly provided with at least one light transmission hole.

6. The light source module according to claim 1, wherein each of the plurality of reflective structures has a reflective portion protruding toward the corresponding point light source.

7. A light source module, comprising:
   a substrate;
   a reflective assembly, disposed above the substrate, wherein the reflective assembly has a plurality of first partition plates disposed along a first direction, a plurality of second partition plates disposed along a second direction and a plurality of reflective structures, the plurality of first partition plates and the plurality of second partition plates cross with each other to form a plurality of reflective holes, an upper surface of the substrate is partially exposed to the plurality of reflective holes, and the plurality of reflective structures are disposed in the plurality of reflective holes respectively; and
   a plurality of point light sources, disposed above the substrate, located in the plurality of reflective holes respectively, and located below the plurality of reflective structures respectively;
   wherein the reflective assembly further has a bottom plate disposed on the upper surface of the substrate and located below the plurality of first partition plates and the plurality of second partition plates, the bottom plate is penetratingly provided with a plurality of penetration holes, the plurality of point light sources are penetratingly provided in the plurality of penetration holes respectively, and the bottom plate, the plurality of first partition plates, the plurality of second partition plates and the plurality of reflective structures are integrally formed.

8. A light source module, comprising:
   a substrate;
   a reflective assembly, disposed above the substrate, wherein the reflective assembly has a plurality of first partition plates disposed along a first direction, a plurality of second partition plates disposed along a second direction and a plurality of reflective structures, the plurality of first partition plates and the plurality of second partition plates cross with each other to form a plurality of reflective holes, an upper surface of the substrate is partially exposed to the plurality of reflective holes, and the plurality of reflective structures are disposed in the plurality of reflective holes respectively; and a plurality of point light sources, disposed above the substrate, located in the plurality of reflective holes respectively, and located below the plurality of reflective structures respectively;

wherein the reflective assembly further has a base plate and a plurality of connecting members, the bottom plate is disposed on the upper surface of the substrate and located below the plurality of first partition plates and the plurality of second partition plates, the bottom plate is penetratingly provided with a plurality of penetration holes, the plurality of point light sources are penetratingly provided in the plurality of penetration holes respectively, each of the plurality of reflective structures is connected to the substrate by at least one of the plurality of connecting members, and the bottom plate, the plurality of connecting members, the plurality of first partition plates, the plurality of second partition plates and the plurality of reflective structures are integrally formed.

9. The light source module according to claim 1, further comprising a frame disposed around the reflective assembly.

10. The light source module according to claim 9, wherein the frame and the reflective assembly are integrally formed.

11. The light source module according to claim 9, further comprising a diffuser plate disposed on the frame and covering the reflective assembly, wherein there is a distance between a top surface of each of the plurality of first partition plates and the plurality of second partition plates and the diffuser plate.

12. A light source module, comprising:

a substrate;

a reflective assembly, disposed above the substrate, wherein the reflective assembly has a plurality of reflective holes and a plurality of reflective structures, each of the plurality of reflective holes is formed by at least one reflective surface not parallel to the substrate, so that an upper surface of the substrate is partially exposed to the plurality of reflective holes, the plurality of reflective structures are disposed in the plurality of reflective holes respectively; and a plurality of point light sources, disposed above the substrate, located in the plurality of reflective holes respectively, and located below the plurality of reflective structures respectively, wherein the reflective assembly further has a plurality of connecting members and a plurality of positioning pillars, each of the plurality of reflective structures is connected with the at least one reflective surface by at least one of the plurality of connecting members, one end of each of the plurality of positioning pillars is connected to one of the plurality of connecting members and another end of each of the plurality of positioning pillars is fixed to the substrate, and the plurality of connecting members, the plurality of positioning pillars, the at least one reflective surface, and the plurality of reflective structures are integrally formed.

* * * * *